(12) United States Patent
Kwon et al.

(10) Patent No.: US 9,343,773 B2
(45) Date of Patent: May 17, 2016

(54) CABLE-TYPE SECONDARY BATTERY

(75) Inventors: Yo-Han Kwon, Daejeon (KR);
Je-Young Kim, Daejeon (KR);
Byung-Hun Oh, Daejeon (KR); Ki-Tae Kim, Daejeon (KR)

(73) Assignee: LG Chem, Ltd. (KR)

( * ) Notice: Subject to any disclaimer, the term of this patent is extended or adjusted under 35 U.S.C. 154(b) by 199 days.

(21) Appl. No.: 13/242,638

(22) Filed: Sep. 23, 2011

(65) Prior Publication Data
US 2012/0015233 A1 Jan. 19, 2012

Related U.S. Application Data

(63) Continuation of application No. PCT/KR2011/000584, filed on Jan. 27, 2011.

(30) Foreign Application Priority Data

Feb. 1, 2010 (KR) .................. 10-2010-0009048
Jan. 27, 2011 (KR) .................. 10-2011-0008217

(51) Int. Cl.
*H01M 6/10* (2006.01)
*H01M 6/42* (2006.01)
(Continued)

(52) U.S. Cl.
CPC .............. *H01M 10/052* (2013.01); *H01M 2/02* (2013.01); *H01M 2/0237* (2013.01); *H01M 4/38* (2013.01); *H01M 4/485* (2013.01); *H01M 4/505* (2013.01); *H01M 4/525* (2013.01); *H01M 4/587* (2013.01); *H01M 4/66* (2013.01); *H01M 4/661* (2013.01); *H01M 4/663* (2013.01); *H01M 4/667* (2013.01); *H01M 4/70* (2013.01); *H01M 6/44* (2013.01); *H01M 10/02* (2013.01); *H01M 10/0413* (2013.01); *H01M 10/0422* (2013.01); *H01M 10/058* (2013.01); *H01M 10/0565* (2013.01);
(Continued)

(58) Field of Classification Search
CPC combination set(s) only.
See application file for complete search history.

(56) References Cited

U.S. PATENT DOCUMENTS 4,522,897 A * 6/1985 Walsh ........................... 429/119
7,618,748 B2 11/2009 Nathan et al.
(Continued)

FOREIGN PATENT DOCUMENTS

JP 04169066 A * 6/1992
JP 08-088019 A 4/1996
(Continued)

OTHER PUBLICATIONS

U.S. Appl. No. 12/243,035.

*Primary Examiner* — Daniel Gatewood
(74) *Attorney, Agent, or Firm* — Lerner, David, Littenberg, Krumholz & Mentlik, LLP

(57) ABSTRACT

Provided is a cable-type secondary battery including an inner electrode comprising at least two anodes arranged in parallel that extend longitudinally and have a horizontal cross section of a predetermined shape, an electrolyte layer serving as an ion channel surrounding the inner electrode, an outer electrode comprising a tubular cathode having a horizontal cross section of a predetermined shape and surrounding the electrolyte layer, and a protection coating surrounding the outer electrode. The cable-type secondary battery has free shape adaptation due to its linearity and flexibility. A plurality of inner electrodes within a tubular outer electrode leads to an increased contact area therebetween and consequently a high battery rate. It is easy to control the capacity balance between the inner and outer electrodes by adjusting the number of inner electrodes.

18 Claims, 1 Drawing Sheet

(51) Int. Cl.

| | |
|---|---|
| *H01M 10/052* | (2010.01) |
| *H01M 2/02* | (2006.01) |
| *H01M 4/38* | (2006.01) |
| *H01M 4/485* | (2010.01) |
| *H01M 4/505* | (2010.01) |
| *H01M 4/525* | (2010.01) |
| *H01M 4/587* | (2010.01) |
| *H01M 4/66* | (2006.01) |
| *H01M 4/70* | (2006.01) |
| *H01M 6/44* | (2006.01) |
| *H01M 10/02* | (2006.01) |
| *H01M 10/04* | (2006.01) |
| *H01M 10/0565* | (2010.01) |
| *H01M 10/0568* | (2010.01) |
| *H01M 10/058* | (2010.01) |
| *H01M 2/16* | (2006.01) |
| *H01M 4/62* | (2006.01) |
| *H01M 4/02* | (2006.01) |
| *H01M 10/42* | (2006.01) |
| *H01M 4/75* | (2006.01) |

(52) U.S. Cl.
CPC ........ *H01M 10/0568* (2013.01); *H01M 2/1673* (2013.01); *H01M 4/624* (2013.01); *H01M 4/75* (2013.01); *H01M 2004/025* (2013.01); *H01M 2010/4292* (2013.01); *Y02E 60/122* (2013.01)

(56) References Cited

U.S. PATENT DOCUMENTS

| | | |
|---|---|---|
| 2001/0046623 A1 | 11/2001 | Akahira |
| 2003/0068559 A1 | 4/2003 | Armstrong et al. |
| 2004/0023119 A1 | 2/2004 | Mizutani et al. |
| 2004/0258982 A1 | 12/2004 | Coffey et al. |
| 2005/0147857 A1 | 7/2005 | Crumm et al. |
| 2005/0170253 A1 | 8/2005 | Yoon et al. |
| 2005/0175890 A1 | 8/2005 | Tsutsumi et al. |
| 2006/0099510 A1 | 5/2006 | Naarmann et al. |
| 2006/0115735 A1 | 6/2006 | Yasuda et al. |
| 2007/0082265 A1* | 4/2007 | Itou et al. ................. 429/223 |
| 2007/0134549 A1 | 6/2007 | Nathan et al. |
| 2007/0243456 A1 | 10/2007 | Ahn et al. |
| 2008/0131784 A1 | 6/2008 | Hwang et al. |
| 2008/0137890 A1 | 6/2008 | Petersen et al. |
| 2008/0241689 A1 | 10/2008 | Takami et al. |
| 2008/0268338 A1 | 10/2008 | Lee et al. |
| 2009/0107746 A1 | 4/2009 | Horie et al. |
| 2009/0146604 A1 | 6/2009 | Choi et al. |
| 2009/0214956 A1* | 8/2009 | Prieto et al. ............... 429/310 |
| 2010/0291431 A1 | 11/2010 | Shih et al. |
| 2011/0189510 A1* | 8/2011 | Caracciolo et al. ........... 429/50 |
| 2011/0274954 A1 | 11/2011 | Cho et al. |
| 2012/0100412 A1 | 4/2012 | Kwon et al. |
| 2012/0219844 A1 | 8/2012 | Tsutsumi et al. |

FOREIGN PATENT DOCUMENTS

| | | | |
|---|---|---|---|
| JP | 08088016 A | | 4/1996 |
| JP | 09-007629 A | | 1/1997 |
| JP | 2001110445 A | | 4/2001 |
| JP | 2007087789 A | | 4/2007 |
| JP | 2008243612 A | | 10/2008 |
| JP | 2010129412 A | | 6/2010 |
| KP | 1020070009231 A | | 1/2007 |
| KR | 1020070009231 | * | 10/2001 |
| KR | 20050030438 A | | 3/2005 |
| KR | 20050099903 A | | 10/2005 |
| KR | 20070009231 A | | 1/2007 |
| KR | 20070043537 A | | 4/2007 |
| KR | 10-0742739 B1 | | 7/2007 |
| KR | 20070075928 A | | 7/2007 |
| KR | 10-0804411 B1 | | 2/2008 |
| KR | 20080067371 A | | 7/2008 |
| KR | 20090009598 A | | 1/2009 |
| KR | 20100006985 A | | 1/2010 |
| WO | WO 2005098994 A1 | * | 10/2005 |
| WO | 2005101973 A2 | | 11/2005 |
| WO | 2009014299 A1 | | 1/2009 |
| WO | 2010076975 A2 | | 7/2010 |

* cited by examiner

CABLE-TYPE SECONDARY BATTERY

CROSS-REFERENCE TO RELATED APPLICATIONS

This application is a continuation of International Application No. PCT/KR2011/000584 filed on Jan. 27, 2011, which claims priorities under 35 U.S.C. §119(a) to Korean Patent Application No. 10-2010-0009048 filed in the Republic of Korea on Feb. 1, 2010 and Application No. 10-2011-0008217 filed in the Republic of Korea on Jan. 27, 2011, the entire contents of which are incorporated herein by reference.

BACKGROUND OF THE INVENTION

1. Field

The present invention relates to a cable-type secondary battery of free shape adaptation.

2. Description of Related Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to help the start-up of vehicles, portable devices, tools, uninterruptible power supplies, and the like. Recently, as the development of wireless communication technologies has been leading to the popularization of portable devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a manufacturing process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of portable devices. Accordingly, there is a need for secondary batteries of a new structure that are easily adaptable in shape.

To fulfill this need, suggestions have been made to develop linear batteries having a very high ratio of length to cross-sectional diameter. Korean Patent Publication No. 2005-0099903 discloses a thread-type flexible battery comprising an inner electrode, electrolyte, and an outer electrode, but having a limited structure of one anode and one cathode and consequently low capacity balance. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this is not based on an outer/inner electrode structure.

BRIEF SUMMARY OF THE INVENTION

It is an object of the present invention to provide a secondary battery of a new linear structure that is easily adaptable in shape and has excellent stability and performance.

A cable-type secondary battery of the present invention may include an inner electrode comprising at least two anodes arranged in parallel that extend longitudinally and have a horizontal cross section of a predetermined shape, an electrolyte layer serving as an ion channel surrounding the inner electrode, an outer electrode comprising a tubular cathode having a horizontal cross section of a predetermined shape and surrounding the electrolyte layer, and a protection coating surrounding the outer electrode.

Also, the cable-type secondary battery may include an inner electrode comprising at least two cathodes arranged in parallel that extend longitudinally and have a horizontal cross section of a predetermined shape, an electrolyte layer serving as an ion channel surrounding the inner electrode, an outer electrode comprising a tubular anode having a horizontal cross section of a predetermined shape and surrounding the electrolyte layer, and a protection coating surrounding the outer electrode.

The anode or cathode may have a cross section of a circular or polygonal shape, wherein the circular shape may be a circular shape of geometrical symmetry or an oval shape of geometrical asymmetry, and the polygonal shape may be a triangular, square, pentagonal, or hexagonal shape.

Preferably, the anode or cathode may include a current collector and an active material layer formed on the surface of the current collector.

In this instance, the current collector may be preferably made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers. The conductive material may include polyacetylene, polyaniline, polypyrrole, polythiophene, polysulfur nitride, indium thin oxide (ITO), silver, palladium, nickel, and copper. Also, the conductive polymer may include polyacetylene, polyaniline, polypyrrole, polythiophene, and polysulfur nitride.

The anode active material may include carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material may include LiCoO2, LiNiO2, LiMn2O4, LiCoPO4, LiFePO4, LiNiMnCoO2, and LiNi1-x-y-zCoxM1yM2zO2 (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from a gel polymer electrolyte of PEO, PVdF, PMMA, PAN, or PVAc; or a solid electrolyte of PEO, polypropylene oxide (PPO), polyethylene imine (PEI), polyethylene sulphide (PES), or PVAc.

In the cable-type secondary battery of the present invention, the electrolyte layer 30 surrounding the inner electrode serves as an ion channel, and is formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid electrolyte of PEO, polypropylene oxide (PPO), polyethylene imine (PEI), polyethylene sulphide (PES), or PVAc. Preferably, a matrix of the solid electrolyte is basically a polymer matrix or a ceramic-glass matrix. Even though a typical polymer electrolyte has sufficient ion conductivity, ions may move slowly, that is, a reaction rate may be low, and thus the gel polymer electrolyte having favorable ion movement is preferred over the solid electrolyte. Because the gel polymer electrolyte has poor mechanical properties, a porous support or a crosslinked polymer may be used to improve the mechanical properties of the gel polymer electrolyte. The electrolyte layer 30 of the present invention may act as a separator, thereby eliminating the use of a separator.

In the cable-type secondary battery of the present invention, the electrolyte layer may further include a lithium salt. The lithium salt may include LiCl, LiBr, LiI, LiClO4, LiBF4, LiBl0Cl10, LiPF6, LiCF3SO3, LiCF3CO2, LiAsF6, LiSbF6, LiAlCl4, CH3SO3Li, CF3SO3Li, (CF3SO2)2NLi, chlorine borane lithium, aliphatic lower lithium carbonate, and tetra-phenyl lithium borate.

The electrolyte layer 30 of the present invention may further contain a lithium salt. The lithium salt may improve ion conductivity and reaction rate, and may include, but is not limited to, for example, LiCl, LiEr, LiI, LiC104, LiBF4, LiBlOC11O, LiPF6, LiCF3S03, LiCF3C02, LiAsF6, LiSbF6, LiAlCl4, CH3S03Li, CF3S03Li, (CF3S02)2NLi, chlorine borane lithium, aliphatic lower lithium carbonate, and tetra-phenyl lithium borate.

EFFECT OF THE INVENTION

A cable-type secondary battery of the present invention, in which a plurality of electrodes are included in another electrode, has free shape adaptation due to its linearity and flexibility, and thus is applicable to various types of portable devices. Also, the battery has a plurality of inner electrodes and a tubular outer electrode, which leads to an increased contact area therebetween and consequently a high battery rate, and by adjusting the number of inner electrodes, it is easier to control the capacity balance therebetween. A short circuit caused by repeated use may be prevented by the presence of a plurality of inner electrodes.

Other features and aspects may be apparent from the following detailed description, the drawings, and the claims.

Figure 1:
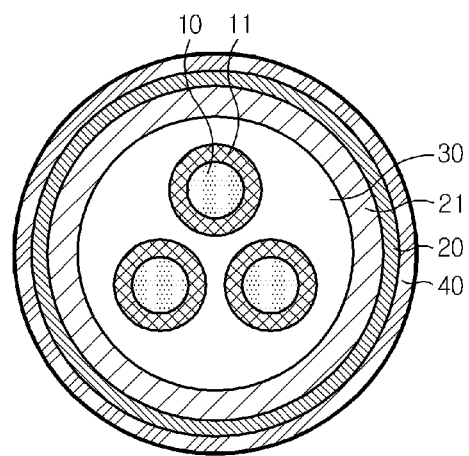
FIG. 1 is a cross-sectional view of a circular cable-type secondary battery.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
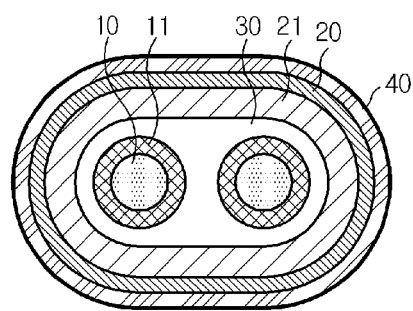
FIG. 2 is a cross-sectional view of an oval cable-type secondary battery.

FIGS. 1 and 2 illustrate examples of cable-type secondary batteries according to the present invention, wherein like elements are referred to like reference numerals. Referring to FIGS. 1 and 2, a cable-type secondary battery of the present invention includes an inner electrode, an electrolyte layer 30, an outer electrode, and a protection coating 40. The inner electrode comprises at least two anodes 10 and 11 arranged in parallel that extend longitudinally and have a horizontal cross section of a predetermined shape. The electrolyte layer 30 surrounds the inner electrode and serves as an ion channel. The outer electrode comprises a tubular cathode 20 and 21 that surrounds the electrolyte layer 30 and has a horizontal cross section of a predetermined shape. The protection coating 40 surrounds the outer electrode. Here, the predetermined shape is not limited to a specific shape, and may include any shape without departing from the spirit and scope of the present invention.

The cable-type secondary battery of the present invention has a horizontal cross section of a predetermined shape and a linear structure extending perpendicularly to the horizontal cross section. Also, the cable-type secondary battery has flexibility and consequently free shape adaptation. The cable-type secondary battery may have various shapes such as, for example, a circular shape of geometrical symmetry as shown in FIG. 1 or an oval shape of geometrical asymmetry as shown in FIG. 2.

The cable-type secondary battery of the present invention has an inner electrode comprising a plurality of anodes and an outer electrode comprising a tubular cathode. The anode or cathode generally includes a current collector and an active material layer formed on the current collector. However, when an active material layer alone functions as a current collector, the current collector may not be necessary. The anode or cathode may have a cross section of a circular or polygonal shape, wherein the circular shape may be a circular shape of geometrical symmetry or an oval shape of geometrical asymmetry, and the polygonal shape is not limited to a specific type of polygonal shape unless it is a two-dimensional sheet type. For example, the polygonal shape may be, but not limited to, a triangular, square, pentagonal, or hexagonal shape.

The inner electrode comprises at least two anodes arranged in parallel, however the present invention is not limited in this regard. For example, a plurality of anodes may be arranged to be straight or twisted. In FIG. 1, an inner electrode is shown comprising three anodes, and in FIG. 2, an inner electrode is shown comprising two anodes.

The cable-type secondary battery comprising a plurality of electrodes has a high battery rate and excellent cell performance as a consequence of an increased contact area with an opposite electrode. Also, the cable-type secondary battery may be subject to a short circuit caused by repeated use due to its flexibility, however the battery may operate even when a short circuit occurs in one electrode. To maintain the capacity balance of the battery, an inner electrode comprising anodes should use a larger amount of an anode active material than that of a cathode active material used in an inner electrode comprising cathodes, due to the fact that an anode active material has a higher capacity per volume than a cathode active material. In the present invention, the capacity balance between inner and outer electrodes may be controlled by adjusting the number of inner electrodes.

Preferably, the anode or cathode of the present invention includes a current collector 10 or 20 and an active material layer 11 or 21 formed on the surface of the current collector 10 or 20 by coating. The active material allows ion migration through the current collector 10 or 20, and ion migration is carried out by intercalation/disintercalation of ions into/from the electrolyte layer 30.

Preferably, the current collector 10 or 20 may be made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

The conductive material may include polyacetylene, polyaniline, polypyrrole, polythiophene, polysulfur nitride, indium thin oxide (ITO), silver, palladium, nickel, and copper. The conductive polymer may include polyacetylene, polyaniline, polypyrrole, polythiophene, and polysulfur nitride. However, the non-conductive polymer used in the current collector 10 or 20 is not limited to a specific type of non-conductive polymer.

The anode active material may include, but is not limited to, carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon.

The cathode active material may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

In the cable-type secondary battery of the present invention, the electrolyte layer 30 surrounding the inner electrode serves as an ion channel, and is formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid electrolyte of PEO, polyphenylene oxide (PPO), polyetherimide (PEI), polyethersulfone (PES), or PVAc. Preferably, a matrix of the solid electrolyte is basically a polymer matrix or a ceramic-glass matrix. Even though a typical polymer electrolyte has sufficient ion conductivity, ions may move slowly, that is, a reaction rate may be low, and thus the gel polymer electrolyte having favorable ion movement is preferred over the solid electrolyte. Because the gel polymer electrolyte has poor mechanical properties, a porous support or a crosslinked polymer may be used to improve the mechanical properties of the gel polymer electrolyte. The electrolyte layer 30 of the present invention may act as a separator, thereby eliminating the use of a separator.

The electrolyte layer 30 of the present invention may further contain a lithium salt. The lithium salt may improve ion conductivity and reaction rate, and may include, but is not limited to, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and 4-phenyl lithium borate.

The protection coating 40 of the present invention acts as an insulator, and is formed on the outer surface of the outer electrode to protect the electrode from moisture in the air or from external impact. The protection coating 40 may include typical polymer resins, for example, PVC, high-density polyethylene (HDPE), or epoxy resin.

Also, the cable-type secondary battery of the present invention may include an inner electrode (cathode) and an outer electrode (anode). That is, the cable-type secondary battery of the present invention may comprise an inner electrode, an electrolyte layer 30, an outer electrode, and a protection coating 40. The inner electrode comprises at least two cathodes 10 and 11 arranged in parallel that extend longitudinally and have a horizontal cross section of a predetermined shape. The electrolyte layer 30 surrounds the inner electrode and serves as an ion channel. The outer electrode comprises a tubular anode 20 and 21 that surrounds the electrolyte layer 30 and has a horizontal cross section of a predetermined shape. The protection coating 40 surrounds the outer electrode. The components for the cathode, the anode, the electrolyte layer and the protection coating may be the above-described components.

Hereinafter, a method for manufacturing the cable-type secondary battery as described above is described below in brief.

The anode or cathode has the active material layer 11 or 21 formed on the current collector 10 or 20 by coating. In this instance, a typical coating process may be used, specifically an electroplating process or an anodic oxidation process. It is preferred to extrusion-coat an electrode slurry including an active material on a current collector through an extruder.

After the formed anode or cathode is applied as an inner electrode, the electrolyte layer 30 is formed around the inner electrode. Alternatively, the inner electrode may be inserted into the electrolyte layer 30. After the inner electrode and the electrolyte layer 30 are formed, the outer electrode and the protection coating 40 are formed thereon. Alternatively, after the electrolyte layer 30, the outer electrode, and the protection coating 40 are formed, the inner electrode may be inserted into the electrolyte layer 30, or after the outer electrode and the protection coating 40 are formed, the inner electrode may be inserted and the electrolyte layer 30 may be then formed.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cable-type secondary battery comprising:
   an inner electrode comprising at least two anodes arranged in parallel, the anode extending longitudinally and having a horizontal cross section of a predetermined shape;
   an electrolyte layer surrounding the inner electrode and serving as an ion channel;
   an outer electrode comprising a tubular cathode having a horizontal cross section of a predetermined shape and completely surrounding the electrolyte layer and the at least two anodes; and
   a protection coating surrounding the outer electrode;
   wherein (i) the anode includes a current collector and an anode active material layer formed on an outer surface of the current collector; and (ii) the cathode includes a current collector and a cathode active material layer formed on the inside of the current collector;
   wherein the anode active material layer is formed from an active material including an active material particle selected from the group consisting of carbonaceous materials, lithium-containing titanium composite oxides (LTOs), metals (Me) including Si, Sn, Li, Cd, Ce, Ni, and Fe, alloys of the metals (Me), oxides (MeOx) of the metals (Me), composites of the metals (Me) and carbon, and mixtures thereof, the cathode active material layer is formed from an active material including an active material particle selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, and mixtures thereof, wherein M1 and M2 are each independently any one selected from the group consisting of Al, Ni, Co, Fe, Mn, V, Cr, Ti, W, Ta, Mg, and Mo, wherein x, y, and z are each independently an atomic fraction of each component in the oxide;

wherein $0 \leq x < 0.5$, $0 \leq y < 0.5$, $0 \leq z < 0.5$, $x+y+z \leq 1$; and wherein the electrolyte layer is formed from an electrolyte including a gel polymer electrolyte selected from the group consisting of PEO, PVdF, PMMA, and PAN, and a lithium salt selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, tetra-phenyl lithium borate, and mixtures thereof;

wherein the protection coating acts as an insulator, is formed on an outer surface of the outer electrode to protect the outer electrode from moisture in the air, and includes a polymer resin.

2. The cable-type secondary battery according to claim 1, wherein the anode has a cross section of a circular or polygonal shape.

3. The cable-type secondary battery according to claim 1, wherein the cathode has a cross section of a circular or polygonal shape.

4. The cable-type secondary battery according to claim 1, wherein the current collector is made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

5. The cable-type secondary battery according to claim 4, wherein the conductive material is selected from the group consisting of polyacetylene, polyaniline, polypyrrole, polythiophene, polysulfur nitride, indium thin oxide (ITO), silver, palladium, nickel, copper, and mixtures thereof.

6. The cable-type secondary battery according to claim 4, wherein the conductive polymer is selected from the group consisting of polyacetylene, polyaniline, polypyrrole, polythiophene, polysulfur nitride, and mixtures thereof.

7. The cable-type secondary battery according to claim 1, wherein the current collector is made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

8. The cable-type secondary battery according to claim 7, wherein the conductive material is selected from the group consisting of polyacetylene, polyaniline, polypyrrole, polythiophene, polysulfur nitride, indium thin oxide (ITO), silver, palladium, nickel, copper, and mixtures thereof.

9. The cable-type secondary battery according to claim 7, wherein the conductive polymer is selected from the group consisting of polyacetylene, polyaniline, polypyrrole, polythiophene, polysulfur nitride, and mixtures thereof.

10. A cable-type secondary battery comprising:
an inner electrode comprising at least two cathodes arranged in parallel, the cathode extending longitudinally and having a horizontal cross section of a predetermined shape;
an electrolyte layer surrounding the inner electrode and serving as an ion channel;
an outer electrode comprising a tubular anode having a horizontal cross section of a predetermined shape and completely surrounding the electrolyte layer and the at least two cathodes; and
a protection coating surrounding the outer electrode;
wherein (i) the anode includes a current collector and an anode active material layer formed on an outer surface of the current collector; and (ii) the cathode includes a current collector and a cathode active material layer formed on the inside of the current collector;
wherein the anode active material layer is formed from an active material including an active material particle selected from the group consisting of carbonaceous materials; lithium-containing titanium composite oxides (LTOs); metals (Me) including Si, Sn, Li, Cd, Ce, Ni, and Fe; alloys of the metals (Me); oxides (MeOx) of the metals (Me); and composites of the metals (Me), carbon, and mixtures thereof, the cathode active material layer is formed from an active material including an active material particle selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, and mixtures thereof, wherein M1 and M2 are each independently any one selected from the group consisting of Al, Ni, Co, Fe, Mn, V, Cr, Ti, W, Ta, Mg, and Mo, wherein x, y, and z are each independently an atomic fraction of each component in the oxide, wherein $0 \leq x < 0.5$, $0 \leq y < 0.5$, $0 \leq z < 0.5$, $x+y+z \leq 1$; and wherein the electrolyte layer is formed from an electrolyte including a gel polymer electrolyte selected from the group consisting of PEO, PVdF, PMMA, and PAN, and a lithium salt selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, tetra-phenyl lithium borate, and mixtures thereof;

wherein the protection coating acts as an insulator, is formed on an outer surface of the outer electrode to protect the outer electrode from moisture in the air, and includes a polymer resin.

11. The cable-type secondary battery according to claim 10, wherein the anode has a cross section of a circular or polygonal shape.

12. The cable-type secondary battery according to claim 10, wherein the cathode has a cross section of a circular or polygonal shape.

13. The cable-type secondary battery according to claim 10, wherein the current collector is made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

14. The cable-type secondary battery according to claim 13, wherein the conductive material is selected from the group consisting of polyacetylene, polyaniline, polypyrrole, polythiophene, polysulfur nitride, indium thin oxide (ITO), silver, palladium, nickel, copper, and mixtures thereof.

15. The cable-type secondary battery according to claim 13, wherein the conductive polymer is selected from the group consisting of polyacetylene, polyaniline, polypyrrole, polythiophene, polysulfur nitride, and mixtures thereof.

16. The cable-type secondary battery according to claim 10, wherein the current collector is made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

17. The cable-type secondary battery according to claim 16, wherein the conductive material is selected from the group consisting of polyacetylene, polyaniline, polypyrrole, polythiophene, polysulfur nitride, indium thin oxide (ITO), silver, palladium, nickel, copper, and mixtures thereof.

18. The cable-type secondary battery according to claim 16, wherein the conductive polymer is selected from the group consisting of polyacetylene, polyaniline, polypyrrole, polythiophene, polysulfur nitride, and mixtures thereof.

* * * * *